June 30, 1931.  I. H. JUDD  1,812,097
MEANS FOR TRANSPORTING VEHICLES AND THE LIKE
Filed May 6, 1929  3 Sheets-Sheet 1
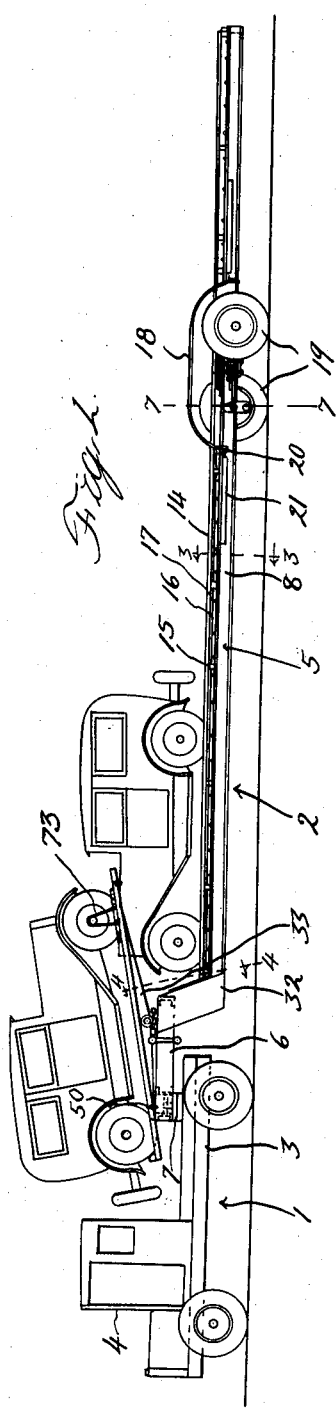
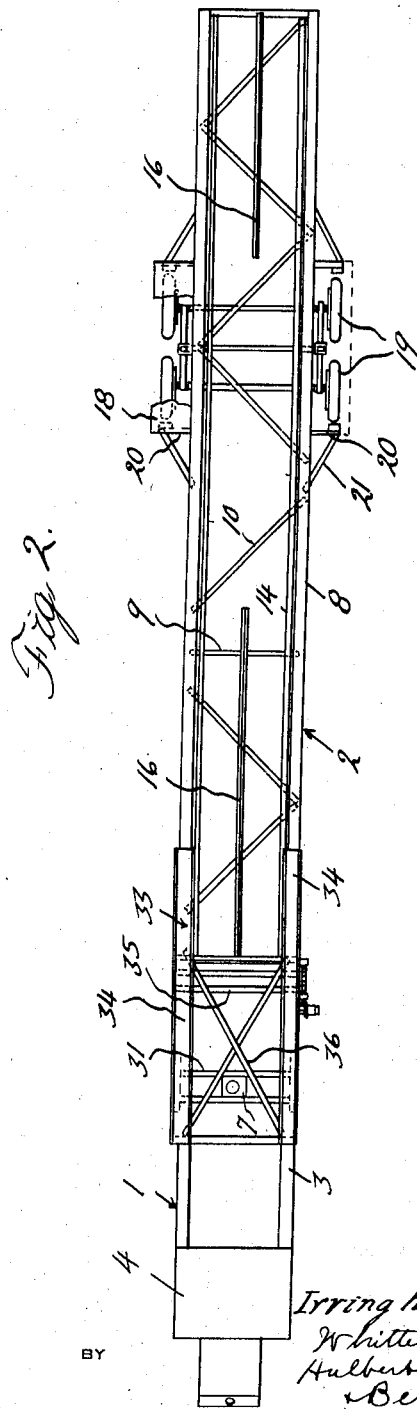
INVENTOR
Irving H. Judd
BY
Whittemore
Hulbert Whittemore
& Belknap
ATTORNEYS

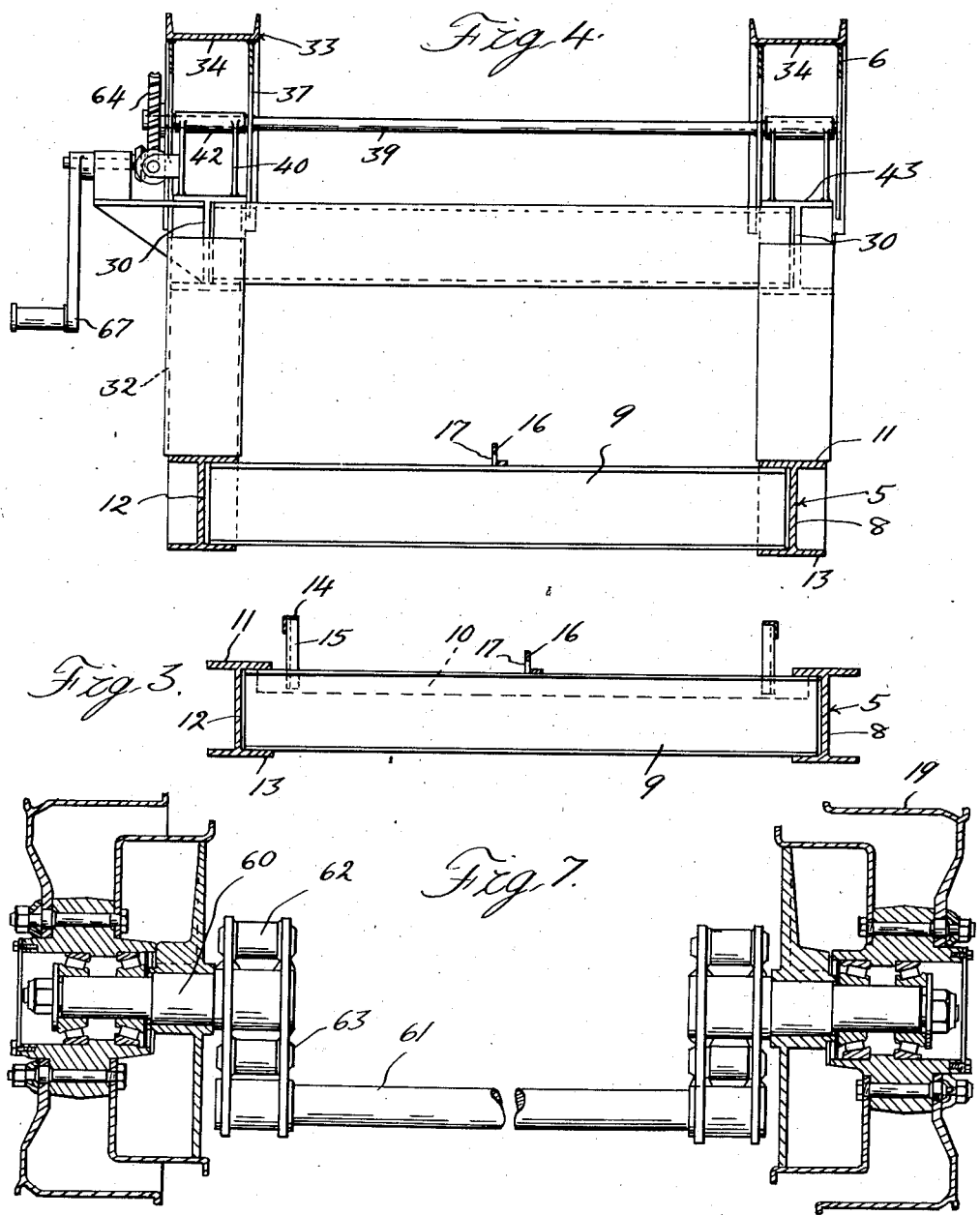

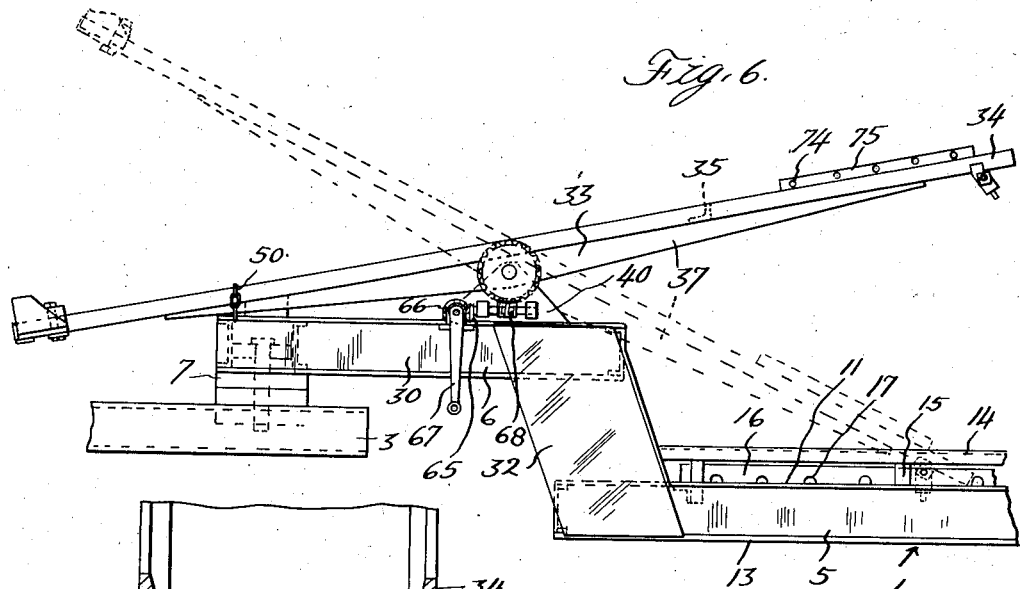
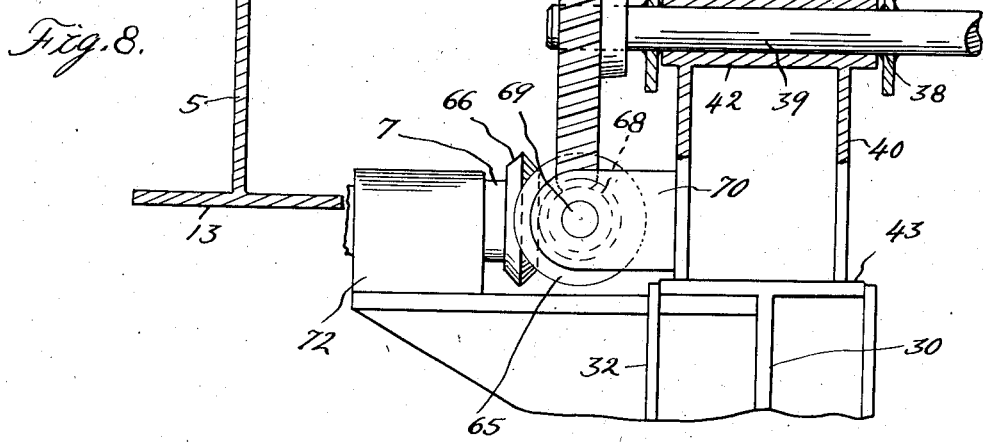

Patented June 30, 1931

1,812,097

UNITED STATES PATENT OFFICE

IRVING H. JUDD, OF DETROIT, MICHIGAN, ASSIGNOR TO WHITEHEAD & KALES COMPANY, OF RIVER ROUGE, MICHIGAN, A CORPORATION OF MICHIGAN

MEANS FOR TRANSPORTING VEHICLES AND THE LIKE

Application filed May 6, 1929. Serial No. 360,908.

This invention relates generally to means for transporting vehicles such as automobiles, trucks and the like and consists of certain novel features of construction, combinations and arrangements of parts that will be hereinafter more fully described, and particularly pointed out in the appended claims.

Heretofore truck-trailer combinations have been used for carrying vehicles such as automobiles, trucks and the like, but due to State laws and requirements the length of such combinations was such (usually 60 feet) that the capacity and loading space of such combinations was limited. For example, the truck-trailer combinations used in the past could not as a general rule carry one large and three small cars or two large and two small cars. Some could carry four medium size cars such as Oaklands having a one hundred and seventeen inch wheel base, but this would not solve the problem of carrying large cars in combination with small cars.

Therefore, it is an object of the present invention to provide a truck-trailer combination of conventional length but having a greater loading space and having a capacity for more vehicles.

Another object is to provide a combination of the type described in which additional loading space is provided by the provision of a platform that is movable relative to the carrier upon which it is mounted to permit the movement of a vehicle thereupon or therefrom; that is adapted when in a predetermined position to permit a portion, for example, the forward end, of a vehicle to be received on the carrier beneath the chassis of a vehicle on the platform; and that is located on the carrier, preferably on a trailer, at such a point that the increased weight so provided will be above the rear axle or driven wheels of the truck and will thereby enable the truck to have better traction.

In the accompanying drawings:

Figure 1 is a fragmentary side elevation of a combination embodying my invention;

Figure 2 is a top plan view of the trailer;

Figure 3 is a section on the line 3—3 of Figure 1;

Figure 4 is a section on the line 4—4 of Figure 1;

Figure 5 is a fragmentary sectional view of the pivot mounting for the tilting platform;

Figure 6 is an enlarged fragmentary side elevation of the truck trailer assembly illustrated in Figure 1 and showing two positions for the tilting platform;

Figure 7 is a section on the line 7—7 of Figure 1; and

Figure 8 is an enlarged fragmentary sectional view through the main frame and tilting platform and showing the means for detachably holding the platform upon the main frame in loading position.

Referring now to the drawings, 1 is a truck and 2 is a trailer of a combination embodying my invention. As shown, the truck 1 is of conventional form and includes the chassis 3, and a cab 4 at the forward end of the chassis. The trailer 2 and particularly the forward end thereof, is of special design and has two frames, one designated by the numeral 5 and constituting the main frame, and the other designated by the numeral 6 and being elevated with respect to the main frame 5, preferably in a plane parallel to the main frame and connected by a suitable fifth wheel 7 to the truck chassis 3 at the rear end thereof.

Preferably the main frame 5 of the trailer has two substantially parallel longitudinally extending I-beams 8, a plurality of cross bars 9, of channel formation, and diagonal braces 10. With this construction, the I-beams 8 of the main frame are spaced the proper distance apart and are arranged so that the flat tops 11 thereof constitute runways for vehicles on the trailer. The cross bars 9 extend between these rails and have their opposite ends welded to the webs 12 and tops 11 and bases 13 thereof. The diagonals 10 are also welded to the tops 11 of the I-beams, preferably to the lower faces thereof and are preferably L-shape in cross section. Rails 14 carried by uprights 15 rising from the I-beams 8 serve to guide the vehicles on the tops 11 of the beams when such vehicles are moved longitudinally of the trailer. In this connection it will be noted that these uprights 15 are L-shape in cross section and are welded to the cross bars 9 and to the diagonals 10 adjacent to their connections with the I-beams. The rails 14 are also L-shape in cross section and are mounted on and welded to the upper ends of the uprights 15. A bar 16, also of L cross section extends longitudinally of the main frame 5, preferably at the longitudinal median line thereof, and is provided with a series of openings 17 in its vertical web for receiving suitable anchorage or hold-down devices (not shown) for holding vehicles on the trailer. As shown, this bar 16 extends the full length of the main frame 5 and is welded to the cross bars 9 thereof. Fenders 18 are also used with the main frame and in the present instance each fender extends over two ground wheels 19 and is welded at its opposite ends to bars 20 that project laterally from the I-beams 8. These bars 20 are preferably L-shape in cross section and in addition to being welded to the I-beams 8 are braced and reinforced by diagonal bars 21, also of L cross section, that are terminally connected, preferably by welding, to said I-beams 8 and bars 20. Preferably the wheels 19 are arranged in tandem and are mounted on laterally projecting elevated portions 60 of drop axle 61 suspended by springs 62 and 63 respectively from the frame 5 of the trailer.

The auxiliary frame 6 also has two substantially parallel I-beams 30, a plurality of cross bars 31, and is connected to the main frame 5 by means of gussets 32 that incline upwardly and forwardly from the I-beams 8 of the main frame at the forward end thereof. These gussets 32 are quite wide and are welded to the I-beams 8 and 30. The cross bars 31 are also welded to the I-beams 30.

Mounted to rock on this auxiliary frame 6 is a vehicle supporting frame or platform 33 that preferably comprises two substantially parallel channel rails 34, cross bars 35 and diagonal braces 36. As shown, the channel rails 34 are of sufficient length to accommodate thereon a long wheel base automobile and constitute runways therefor. The bases of the rails 34 are welded to laterally spaced vertically disposed heavy gage sheet metal members 37 of triangular formation that are provided intermediate of their ends with aligned openings 38 that receive a trunnion 39 on triangular shaped risers 40 on the I-beams 30 of the auxiliary frame. Preferably this trunnion 39 is welded to the members 37 at the edges of the openings 38 and rotates in a tube 42 rigid with the risers 40, and the latter are welded to the tops 43 of the I-beams 30. Any suitable means such as gearing 64, 65 and 66 and an operating crank 67 may be used to rock the platform 33 on the auxiliary frame. As shown, the gear 64 is rigid with the trunnion 39 and meshes with a worm 68 on a suitable shaft 69 journaled in brackets 70 projecting laterally from the outer side of one of the risers 40. The gear 65 is rigid with the stub shaft 69 and meshes with the gear 66 which in turn is rigid with a stud shaft 71 to which the crank 67 is secured. This stub shaft 71 is preferably journaled in a bracket 72 on the adjacent beam 30 of the frame 6.

Thus with this construction, the platform 33 may rest upon the auxiliary frame as illustrated by full lines in Figure 1 or may be rocked to the dotted position in Figure 6. When in the last mentioned position, the bases of the channel rails 34 rest upon the tops 11 of the I-beams 8 of the main frame and a vehicle such as an automobile or truck may be moved or driven upon said platform. The platform 33 may then be rocked by the crank 67 to the elevated position illustrated by full lines in Figure 6. Any suitable means such as the tie member 73 may be engaged with the openings 74 in the anchorage strips 75 on the outer walls of the channels rails 34 to hold the vehicles on the tilting platform. Likewise, any suitable means such as the clamp 50 may be used to hold the tilting platform in the full line position illustrated in Figure 1. A hook 76 pivoted on a spring pressed plunger 77 carried by an L-bar 78 on the lower face of one of the channel rails 34 may be engaged with the top 11 of the adjacent I-beam of the trailer frame 5 to hold the platform in the position illustrated by dotted lines in Figure 6.

After an automobile has been moved upon the platform and the latter has been tilted to the position illustrated by full lines in Figure 6 and has been clamped in this position by the clamp 50, other automobiles or vehicles may then be moved or driven upon the main frame 5. In fact, another large car and two small ones may then be carried by the main frame 5 of the trailer 4. Due to the construction and arrangement of the tilting platform with respect to the main frame, the forward end of an automobile or other vehicle may be received on the main frame 5 immediately in rear of the auxiliary frame 6 beneath the chassis of the vehicle on the tilting platform, as illustrated in Figure 1. Thus my trailer construction has a greater loading space and a capacity for more cars. The increased load produced by the tilting platform and overlapping cars over the rear end of the truck also increases the traction of the truck.

While it is believed that from the foregoing description, the nature and advantages of my invention will be readily apparent, I desire to have it understood that I do not limit myself to what is herein shown and described and that such changes may be resorted to when desired as fall within the scope of what is claimed.

What I claim as my invention is:

1. Transportation means of the class described including vehicle carrying means, an auxiliary vehicle carrying means carried by the first mentioned means and including a vehicle carrying platform movable relative to the first mentioned means to receive a vehicle therefrom and movable to a position a sufficient distance above said first mentioned means to permit of the reception of a portion of a vehicle on said first mentioned means below said auxiliary means.

2. Transportation means of the class described including a trailer having two frames, one constituting an elevated extension of the other, and vehicle carrying means pivoted upon the elevated frame.

3. Transportation means of the class described including a trailer having two frames, one being elevated with respect to the other and projecting forwardly therefrom, and tilting vehicle carrying means having a pivot intermediate its ends carried by the elevated frame.

4. Transportation means of the class described including a vehicle having a main frame provided with means for carrying vehicles, structural elements extending upwardly from said frame at the forward end thereof, an auxiliary frame rigidly secured to and projecting forwardly from said structural elements at the upper end thereof, and vehicle carrying means pivotally mounted on said auxiliary frame.

5. Transportation means of the class described including a vehicle having two longitudinally extending I-beams constituting vehicle carrying runways, cross bars extending between and connected to said beams, diagonal members secured to said beams, and guide means for vehicles on said I-beams, said guide beams including rails and being carried by said diagonal members.

6. Transportation means of the class described, comprising a trailer having a main frame of sufficient length to carry a plurality of automobiles, structural elements extending upwardly from the frame at the forward end thereof, an auxiliary frame projecting forwardly from the structural elements and adapted to rest upon the rear end of a truck, and a tilting platform of sufficient length to carry an automobile mounted upon the auxiliary frame.

7. Transportation means of the class described, comprising a trailer having a main frame of sufficient length to carry a number of automobiles, structural elements extending upwardly from the frame at the forward end thereof, an auxiliary frame projecting forwardly from the structural elements and adapted to rest upon the rear end of a truck, and a movable platform, of sufficient length to carry an automobile, mounted upon the auxiliary frame and engageable with the main frame to permit an automobile to move from the main frame upon said auxiliary frame or from the auxiliary frame upon the main frame.

8. Transportation means of the class described, comprising a trailer having a main frame of sufficient length to carry a number of automobiles, structural elements extending upwardly from the frame at the forward end thereof, an auxiliary frame projecting forwardly from the structural elements and adapted to rest upon the rear end of a truck, and parallel rails, of sufficient length to carry an automobile, pivoted intermediate their ends upon the auxiliary frame so that their rear ends may be engaged with the main frame to permit an automobile to move from the main frame upon said rails or vice versa.

9. Transportation means of the class described including a vehicle having two rigid frame portions, one being in advance and above the other, and a platform of sufficient length pivotally mounted intermediate its ends on the uppermost frame portion to carry a vehicle and movable to loading and unloading positions in respect to said lowermost frame.

10. Transportation means of the class described including a semi-trailer having a portion attachable to a motor driven vehicle and having a drop frame in rear of said portion provided with means for carrying at one time a plurality of vehicles arranged end to end, and a tilting platform pivoted intermediate its ends on the portion aforesaid and being of sufficient length to carry an automobile, said platform being adapted to receive an automobile from and to unload an automobile upon the means aforesaid.

11. Transportation means of the class described including a main vehicle transporting means adapted to support a plurality of vehicles, an auxiliary vehicle transporting means, and means pivotally mounting said auxiliary vehicle transporting means for oscillation above and in advance of said main vehicle transporting means and to loading and unloading positions with respect thereto.

12. Transportation means of the class described including a vehicle having two frame portions one being above the other, one of said frame portions being relatively long and of sufficient length to carry a plurality of vehicles arranged end to end and the other of said frame portions being relatively short, a platform of sufficient length to carry a vehicle, and means pivotally mounting said platform intermediate its ends on the shorter of said frame portions for movement to loading and unloading positions with respect to the longer of said frame portions.

In testimony whereof I affix my signature.

IRVING H. JUDD.